United States Patent

[15] 3,649,149

Kemper

[45] Mar. 14, 1972

[54] DOUGH HANDLING AND SHAPING APPARATUS

[72] Inventor: Kate Kemper, Longestrasse 8-10, Neuenkirchen Ueber Gutersloh, Germany

[22] Filed: Nov. 4, 1969

[21] Appl. No.: 873,960

[30] Foreign Application Priority Data

| Nov. 7, 1968 | Germany | P 18 07 400.5 |
| Mar. 11, 1969 | Germany | P 19 12 206.6 |
| Sept. 16, 1969 | Germany | P 19 46 703.9 |

[52] U.S. Cl. ............................ 425/241, 259/185, 425/89, 425/98, 425/200
[51] Int. Cl. .................................... A21c 5/00, A21c 11/10
[58] Field of Search .................. 107/1 E, 4 A, 4 B, 30, 69, 107/68, 9 A, 9 D, 9 E, 9 EA, 13, 34, 10–13

[56] References Cited

UNITED STATES PATENTS

| 987,525 | 3/1911 | Wing | 107/1 E |
| 1,652,325 | 12/1927 | Plescher | 107/4 B |
| 2,119,017 | 5/1938 | Marasso | 107/4 B |
| 2,119,018 | 5/1938 | Marasso | 107/4 B |
| 2,243,338 | 5/1941 | Harber | 107/9 A |
| 2,858,775 | 11/1958 | Marasso | 107/15 AD |

FOREIGN PATENTS OR APPLICATIONS

| 622,553 | 1927 | France | 107/4 B |
| 1,226,052 | 1966 | Germany | 107/4 B |
| 350,910 | 1931 | Great Britain | 107/9 A |
| 368,764 | 1963 | Switzerland | 107/9 A |

*Primary Examiner*—Henry C. Sutherland
*Attorney*—Leon M. Strauss

[57] ABSTRACT

The invention deals with a certain bakery machine or system, which tends to fully automate treatment and delivery of dough or like mass, its measuring and dividing into dough pieces or portions, successively, and conditioning the same in view of their weight, dimensions and consistency so that variegated plastic or dough products may be directed and fed into associated kneader or rounder devices, preferably at one and the same time and in a most economical, hygienic and speedy manner for subsequent delivery into bakery ovens or like treatment equipment.

More specifically, the invention envisions the sensing of the locations of the dough pieces, the influences on the uniformity of shape, density and fermentation of such individualized bakery products, in particular of rolls, buns and the like, the coordination of various operations of a combined dough dividing and kneading machinery and other advantages and capabilities of the latter inherently possessed by the present invention.

13 Claims, 16 Drawing Figures

Patented March 14, 1972
3,649,149
8 Sheets-Sheet 1
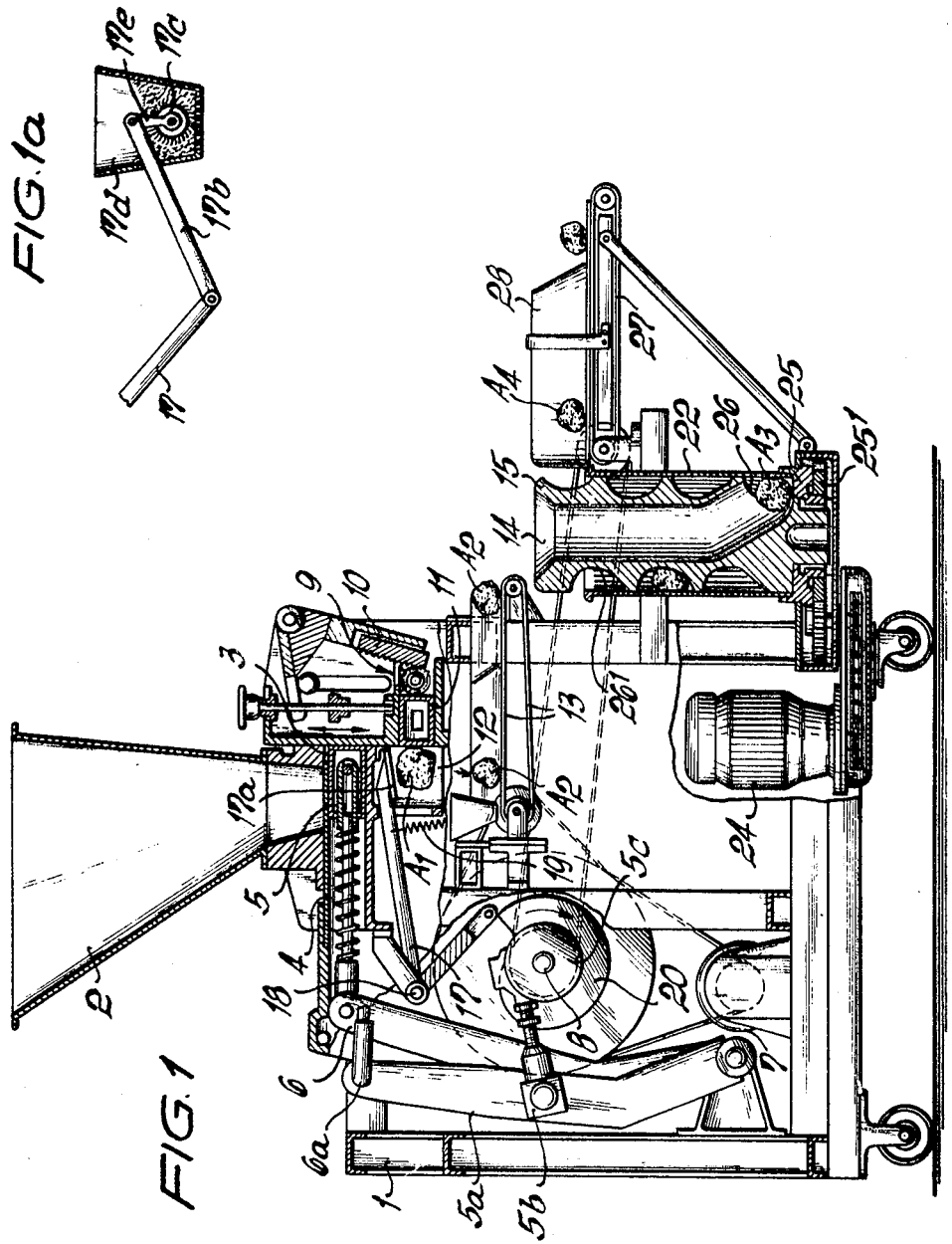
INVENTOR
KATE KEMPER Patented March 14, 1972 3,649,149

INVENTOR
KATE KEMPER

BY Leon M. Strauss
AGT.

INVENTOR
KATE KEMPER

Patented March 14, 1972 3,649,149
8 Sheets-Sheet 4
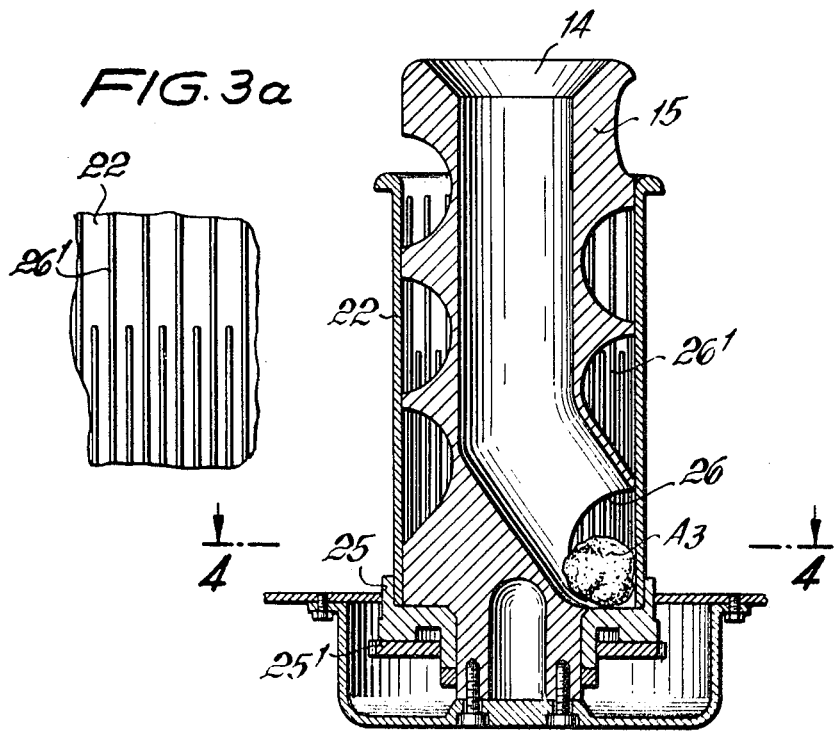
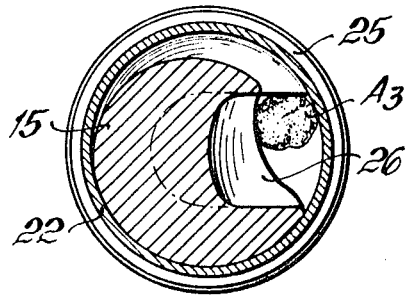
INVENTOR
KATE KEMPER

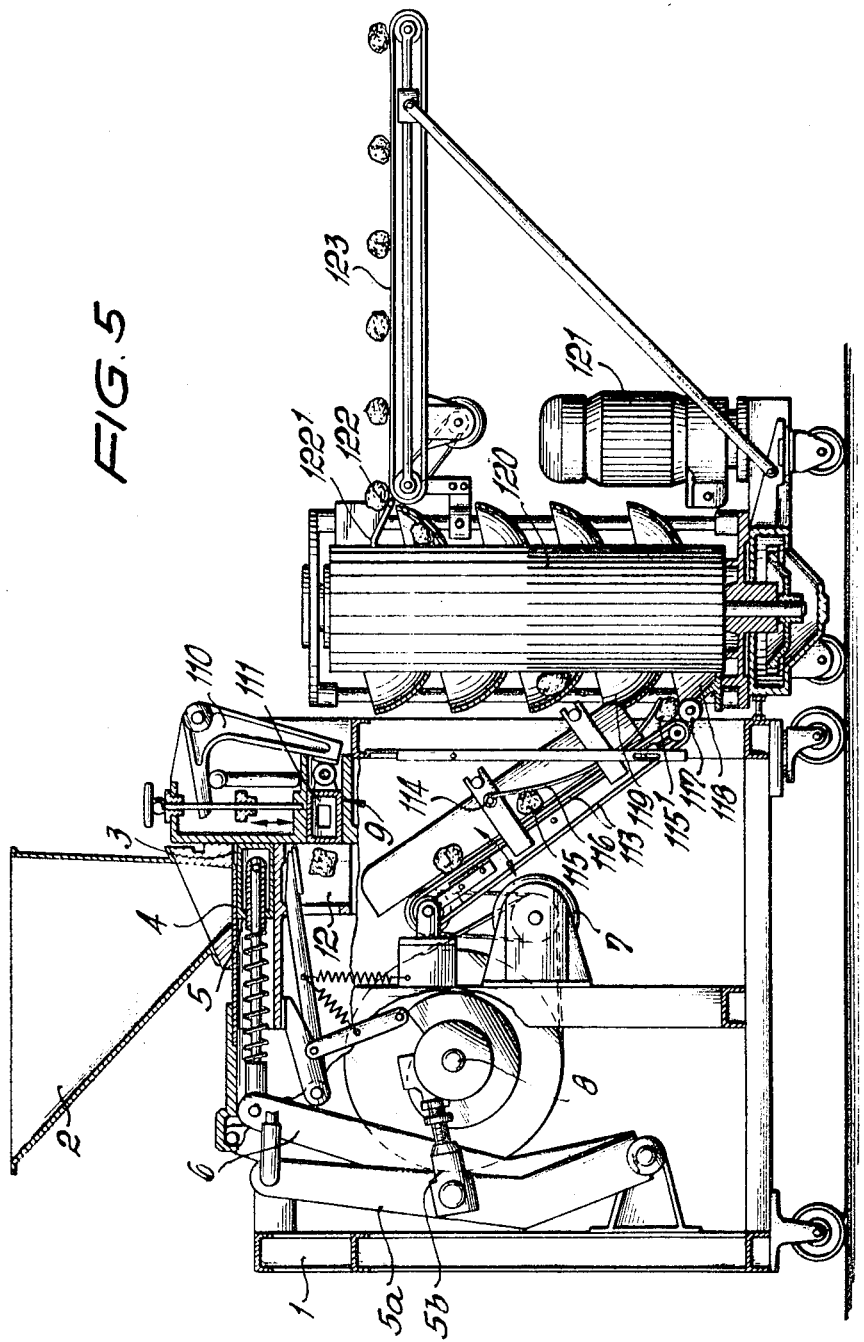

Patented March 14, 1972

INVENTOR
KATE KEMPER
BY Leon M. Straus
AGT.

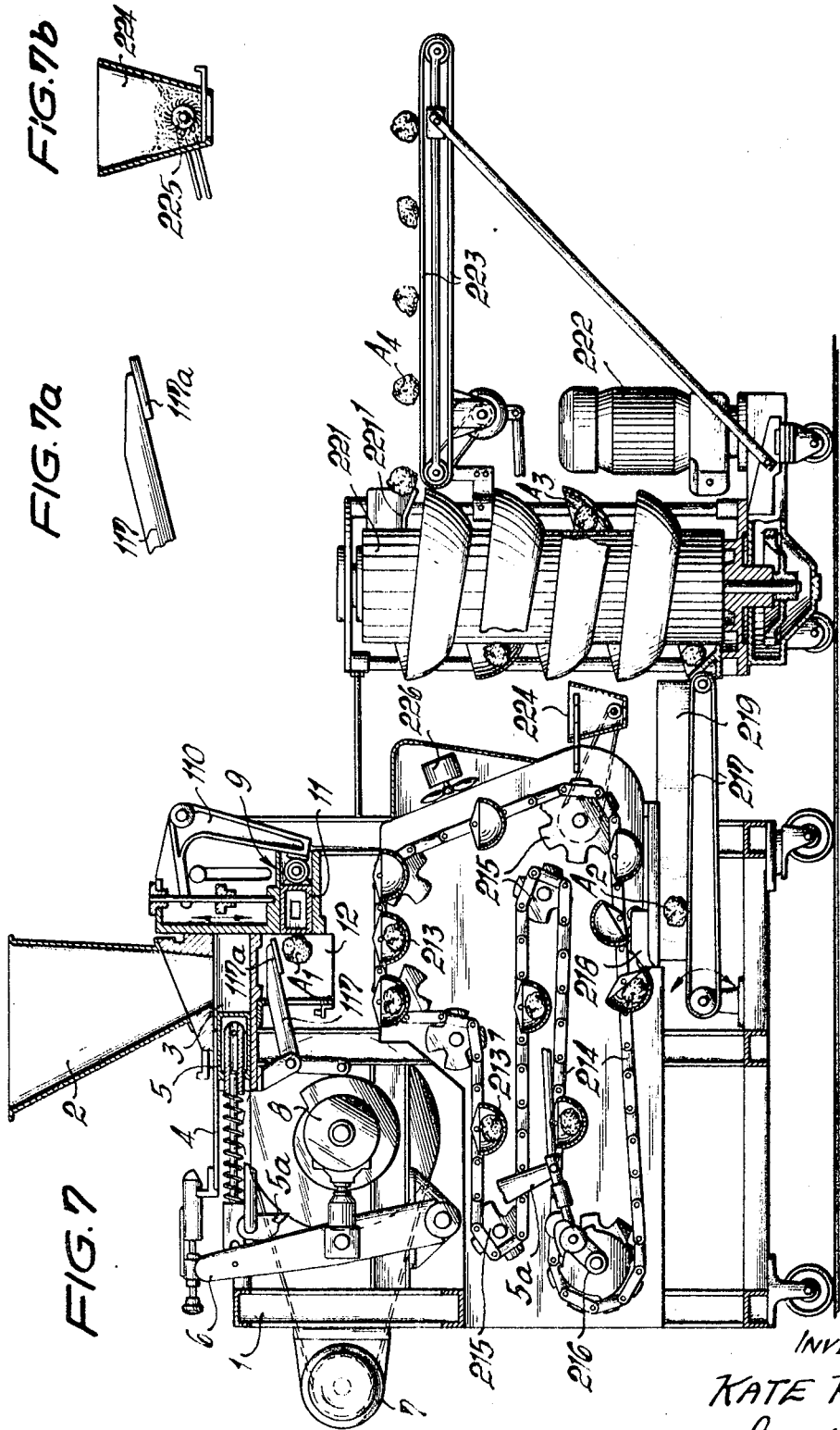

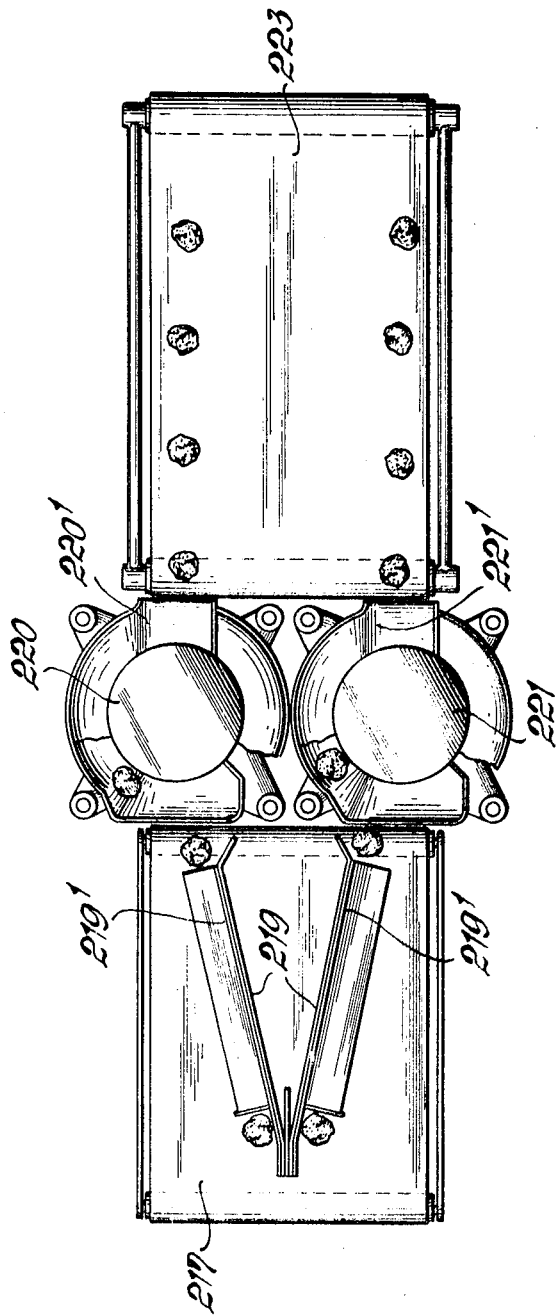

DOUGH HANDLING AND SHAPING APPARATUS

BACKGROUND OF THE INVENTION

The invention concerns improvements in or relating to bakery machinery and particularly machinery which comprises a dough dividing or apportioning unit with an associated rounder or kneading unit.

Combinations of dough dividing and circular kneading or rounder machines whose work is based on various principles, are known per se.

In most cases the dough dividing unit is arranged on a level above or next to the circular kneading machine so that the apportionate or measured dough can be fed directly to the rounder.

Heretofore known dough dividing machines have a dough feeding device as well as an ascending and descending measuring chamber with a graduated piston moving and actuatable in this measuring chamber. The volume of the measuring chamber can be adjusted at will so that the dough dividing machine offers a sufficiently large leeway regarding the size or dimension of the dough pieces to be ejected and delivered. Such dough dividing machine was, however, only used as a separately working machine. This known dough dividing machine ejects further only a single dough piece or portion at a time so that such machinery is not suitable for simultaneously and successively charging several rounders.

Circular kneading machines were also known heretofore combined with a dough dividing machine. Such machinery consists of a drum-type circular kneader which is provided with two drums which are arranged horizontally and coaxially one within the other and rotate in the same sense and direction. The inner rotating drum is designed as a kneading drum and can be moved back and forth relative to the outer drum which is provided with kneading zones or areas in the form of surface openings in the mantle. Along the circular dough kneading zone the drum-type circular kneader is surrounded by a belt moving at the same speed. The mantle or shell openings of the drum must be adapted to the size of the respective dough pieces to be processed, since the dough will stick to the drum walls with a too large amount or portion of dough, and will thus break up, while a too small amount of dough will not come in touch or contact with the inner kneading drum, so that the kneading operation becomes ineffective and remains incomplete. Another disadvantage is that the kneading path or channel cannot be varied and changed.

These shortcomings permit only the production of dough pieces of a certain type or size; in other words, further drums have to be employed for carrying out production of larger and/or smaller dough pieces.

So-called cone-type circular kneaders or rounders are also known which are used independently of dough dividing machines. The dough piece is then charged into a hopper practically arranged in the center of a hollow cylinder. Spirally widening or enlarging kneading tracks receive the dough piece. Due to the rapid rotation of the kneading drum, the dough piece is rolled upward along the spiral path and thus kneaded while subjected to rotating step. Finally, after arrival at the outlet the dough piece leaves the machine via a discharge plate. This cone-type circular kneader is also not variable to permit processing of dough pieces of different size or dimension and varying dough consistency in the same machine.

All combination dough dividing and circular kneading machines known so far show in practice another great disadvantage regarding the dough weight range to be processed. The machines are built as a rule for a weight range of between 30 g. to 75 g. and are intended primarily for producing rolls. Dough pieces weighing less than 30 g. and up to 280 g. which are to be worked upon in great numbers in bakeries could not be processed mechanically up to now and required special machines.

SUMMARY OF THE TECHNICAL DISCLOSURE OF THE INVENTION

The aim of the present invention is to eliminate the abovementioned and other disadvantages and to provide a bakery machine which is capable of processing dough material of a wide weight range, also pieces of dough of different consistency, while maintaining the same quality of the end product and producing a greater number of dough pieces within these wide weight ranges per unit of time than presently known machines.

To achieve this aim and solve other problems, a bakery machine is contemplated which comprises a composite dough dividing and associated rounder or kneading means, where the same is composed of one or several kneading spiral tracks or troughs which are accommodated in a rotatably mounted drum. A cylindrical body trough is provided with a centrally arranged bore along its longitudinal axis, which bore leads at the lower end thereof radially to the outside wall surface and which passes along the outer wall of the rounder and extends into an upwardly directed spiral track or trough. The kneading drum surrounding the kneading track has grooves or flutes extending in axial direction of the drum and along the inner wall thereof, in order to improve the step of rolling off the dough pieces.

It is therefore a primary object of the present invention to provide means facilitating the construction of a compact and well arranged composite machine of the aforesaid type, which may be easily surveyed even by unskilled labor, whose effective parts are readily accessible and work almost silently and which ensures highly economical operational working conditions for expeditious, large scale and cost-reducing production of dough and like plastic bodies.

It is another important object of the present invention to provide means resulting in an efficacious bakery machine structure which is simplified to such a degree that it necessitates but a single power drive for its continuous operation and is capable of being employed for the obtainment of a great variety of bakery products.

Still another prominent object of this invention resides in the provision of means conducive to a uniform treatment and preparation of products of the aforesaid type which are substantially equal in quality and of extremely good firmness and staying power prior to their transfer into the oven, the course to be followed in the present system and the composite machine herein contemplated, which takes up the smallest possible space, for carrying out the operational stages of the delicate dough handling, are very satisfactory in practice, completely hygienic and were found to be highly desirable in the bakery field.

According to the invention the dough dividing machine is provided with a suction chamber which forces the received dough over a measuring chamber by means of a piston into a shaft equipped with knives. This shaft is subdivided by the knives corresponding to the number of kneading coils, in order to render the possibility of simultaneously charging all kneading units arranged therebeneath.

In a further advantageous development of the invention the speed of rotation of each kneading drum or shell is infinitely variable. This has the effect that doughs having different consistencies can be processed with the same quality and efficiency.

The different dough consistency is generally caused by using different types of flour and various amounts of liquid.

According to the invention each kneading coil can also be driven in opposite direction to the kneading drum or shell. The kneading intensity can thus be improved. The pitch of the coil extends in the direction of rotation of the kneading shell so that the dough pieces are rolled upward by the rotation of the kneading mantle or shell. For the adaptation to dough pieces of different sizes, the length of the kneading path can be varied according to this invention. This is effectuated in a manner that each kneading coil can be adjusted or varied continuously in height relative to its kneading drum. The speed of rotation of each kneading coil is also infinitely variable.

In order to prevent undesirable work stoppages or interruptions it is of advantage that the bore of the kneading coil provided along the center of the longitudinal axis of the kneader which leads to the outside wall surface at the lower end of the bore, opens onto a rotating bottom plate and passes then over into an upwardly directed spiral groove or path extending along the outer wall of the kneader coil.

Care must be taken with respect to the vertical adjustment of the kneading coil that the dough pieces are discharged at the location of the conveyor arrangement provided therefor. This can be effected by a horizontal adjustment of the kneading coils. If this possibility of adjustment becomes less desirable, then it is of advantage to provide a rosette-type discharge which receives the dough pieces and feeds them to a suitable conveyor. If several kneading coils are employed, it is advisable to arrange them so that they can be driven by a single motor.

The kneading coil can be readily removed in a simple manner for cleaning purposes. To this end the entire kneading unit is mounted tiltably about a common axis.

If the dough pieces are to be observed and checked during the kneading stage, it is of advantage to replace the above-mentioned kneading unit by a similar machine disclosed further herein.

If the dough is too soft or too sticky, it is proposed to sprinkle the dough pieces during the kneading stage by means of flour. If such corresponding treatment is not possible during kneading, it becomes necessary to use a predetermined consistency of the dough if the end product is to assume maximum quality.

In order to obtain a solution for the above-mentioned problem it is preferred to employ a circular kneading machine which has kneading cylinders provided with axial flutes or grooves which are surrounded helically by a kneading canal or trough consisting of elements in the form of half shells. According to this embodiment of invention the supply of the measured dough pieces is effectuated over a feed belt forming part of the dough dividing machine directed to one of the spiral windings of the circular kneading devices. According to the invention a delivery or feed belt associated with such dough dividing machine is so adjustable that different winding sections of the cylinder kneader or kneaders can be charged with weight-measured dough pieces. In order to prevent a too soft dough piece from sticking to the delivery means or roller, an additional roller is disposed according to the invention at the discharge end of the delivery conveyor, which latter roller rotates at a slightly higher speed than the roller of the delivery conveyor, so that a clean transfer of the dough pieces from the delivery conveyor belt to the cylinder kneader is ensured. To enable the mentioned additional roller or like accessory element to perform this function and result, it is proposed to coat the effective surface thereof with dough-repelling material, for example, a "Teflon" layer. The delivery belt arranged in the dough dividing and measuring unit is preferably so designed that it can charge several cylindrical kneaders at the same time. To this end there is preferably provided a deflecting device which may assume the form of stationary plates or sheets arranged at a certain angle to each other.

As mentioned above, the machine according to the invention may be particularly so designed, that it can process different amounts or quantities of dough. In order to achieve this, the measuring chamber receiving the dough must be varied or adjustable. Preferably, in varying the dimension of the measuring chamber the cross section thereof is left unchanged and only its length is changed or varied, so that the respective measured dough piece assumes the form of a square or parallelepiped. If such a dough in the form of a parallelepiped drops onto the delivery conveyor belt, it is no longer possible to convey such dough piece into the kneading trough without breaking same. For that reason the conveyor belt is provided according to another feature of the invention with one or several trails or tractive sheets depending on the number of cylindrical kneaders to be supplied simultaneously. The trails are so secured on their upper end above the conveyor belt that the dough pieces moved by the conveyor belt become located between the delivery belt and the sheet. The bottom end of the sheet can touch the surface of the belt when there is no dough piece therebetween. Preferably the sheet has the form of a band made of predetermined wire mesh. This is of particular advantage, since the dough pieces can be treated during this delivery stage by means of oil, flour particles, air and the like, depending on the consistency of the respective dough pieces. The sheet may also consist of linen or felt cloth in the form of a band (in curling or other condition).

In order to be able to relinquish and remove the finished dough pieces from the cylindrical kneader device, another delivery conveyor belt is preferably provided at the outlet of the device so that the kneaded dough pieces can be discharged simultaneously from each kneader device, which are then fed and conveyed to other machines or devices for further processing.

In the presently known composite dough dividing and circular kneading machines the dough pieces are fed to the kneader immediately after the division took place over a conveyor device without any marked delay. This stage, however, poses the following problem: Soon after the kneading of dough the ensuing fermentation process sets in, which is interrupted at least partly in an adverse manner by unavoidable dividing and weighing operations. The thus interrupted process must be compensated for in known machines by a considerably longer and final time of fermentation.

The present invention envisages furthermore the solution of reducing to a minimum and compensating for the aforesaid interruption of the fermentation process caused by the dividing and weighing operations, but without reducing the technical and economical efficiency of the entire bakery machine aggregate.

As one of the many solutions of this problem is envisioned pursuant to the invention that the independently working circular kneading machine is coupled mechanically with the dough dividing machine in such a way, that the supply of the measured dough lumps or pieces can be effected via a delivery belt into one of the windings or spiral troughs of the circular kneaders, an additional conveyor device or system for the dough pieces being then arranged between the dough dividing machine and the first-named delivery belt. This conveyor system consists according to the invention, of several conveyor belts arranged partly one beneath the other and runnning in synchronism with the working cycle of the dough dividing machine. Preferably, the conveyor system comprises bucket or tray conveyor means whose movement is adapted and adjusted to the working cycle of the dough dividing machine. The bucket conveyor means comprise a great number of freely swingable buckets, which are moved and carried by means of one or several chain drives. In order to ventilate and to dry the dough pieces during their transportation and conveyance, the buckets are provided with apertures according to the invention, In order to provide sufficient support and retention for the dough pieces the buckets are lined with a suitable porous material, e.g., with felt cloth. The buckets are positively guided and directed in the dough dividing machine so that the dough pieces ejected at the same time from the dough dividing machine reach and drop into registering buckets. The bucket conveyor is driven from a stop motion device or a step by step gear mechanism equipped with ratchet and pawl. The power transmission therefor originates from the main drive of the dough dividing machine. The transit time of the dough pieces is so selected that it lasts about one minute. In order to allow the dough pieces to drop on a moving delivery belt, a deflecting device is provided by which the arriving buckets are properly directed and turned. With respect to the delivery belt wedge plate means may be preferably arranged, so that the dough pieces can be fed to the respective circular kneaders. Above the belt there are disposed pressure plates and/or drag sheets to effect rough preshaping of the dough pieces. The circular kneaders are joined by a delivery conveyor belt which is driven by a step gear mechanism. The step gear mechanism according to the invention is so designed and equipped that any further movement of the delivery belt is only actuated when, in the case of $n$-circular kneaders, the $n^{th}$ dough piece per step drops on or contacts the delivery belt, so that all n-dough pieces are arranged in a single row. For the control of this step by step gear mechanism are advantageously employed photocells, and like sensing elements known per se.

Other objects and purposes of this invention will become apparent to persons familiar with this type of equipment upon studying the following specification and examining the accompanying drawings, in which:

FIG. 3 is a vertical section through a part of the rounder or kneading machine to which reference is made in the specification.

FIG. 4 is a vertical section taken along lines 4—4 according to FIG. 3.

FIG. 5 is a partial and vertical section through another embodiment of a machine pursuant to the invention, comprised of a dough dividing and measuring unit, as well as of a cylindrical kneader device.

FIG. 7 is a vertical section through still another embodiment of a bakery machine according to the invention having incorporated a dough dividing and measuring unit, as well as a rounder constituting a cylindrical kneader.

FIG. 8 illustrates a top plan view of a delivery belt and of an additional delivery conveyor to two adjacent cylindrical rounders as depicted in FIG. 7.

DETAILED DESCRIPTION

Figure 1B:
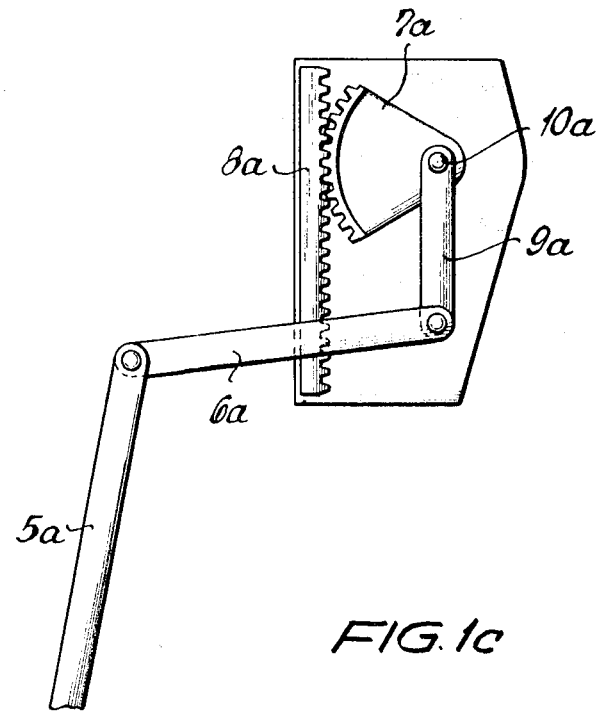
FIG. 1 shows a partial medial vertical cross section through a bakery machine pursuant to the invention.

Referring now more specifically to FIGS. 1 to 4, there is disclosed a casing 1 of a bakery machine pursuant to the invention. At the uppermost end there is arranged a hopper 2 for receiving a supply of dough. Beneath hopper 2 is arranged a suction chamber 3 which can be separated from the hopper by a displaceable knife 4, and in which a piston or ram 5. The knife 4 and the piston 5 is reciprocably movable are moved by means of an associated lever 6, which, in turn, is driven by the motor 7 via crankshaft 8. Besides suction chamber 3 is arranged a dough measuring chamber 9, which is moved back and forth through the action of a toothed segment 10 which is mounted in the casing 1.

Piston 11 is displaced by said toothed segment 10. This piston receives the dough A1 in its top position from the suction chamber 3 and forces it into the bottom position, as indicated by opposed arrows in FIG. 1, into the shaft 12 which is provided with a knife (not shown). From there the cut dough pieces are ejected onto a discharge conveyor 13 which brings these pieces to the respective central bore 14 of the rounder or kneading units 15 and 16 (FIG. 2). The ejection of the dough pieces is effected by actuation of a lever 17 acting as a fork and provided with knock-off plates, which lever is suddenly released after a predetermined time delay when the measuring chamber piston 11 has ejected the divided dough piece. In order to facilitate this action, lever 17, which is rotably mounted about shaft bearing 18, is released within sufficient time over a draw spring 19 which is tensioned by means of a cam disk 20 on shaft 8. The release of lever 17 must be effectuated when the piston 11 of the measuring chamber has ejected the separated or cut off dough portion, the measuring chamber being then moved upward and passes completely the horizontal cutting surface. The dough pieces divided by means of a stationary dividing knife, for example, into two dough pieces of equal size, are thrown downward during the sudden descent of lever 17 by means of its knock-off plates. ON the underside of these knock-off plates are arranged according to the invention, any suitable dough repellent foils which ensure the detachment and freeing even of small sticky weighty dough pieces. The partial weight of the dough piece, no matter how small, is thus transferred to the discharge conveyor 13 in a satisfactory step and at the precise time. The dough pieces A2 drop thus onto the discharge belt 13, which is provided according to FIG. 2 with an expansion or spreading plate 21, along which the dough pieces are fed to the kneading units 15 and 16.

Each kneading unit 15, 16 is adjustable in height by means of a spindle relative to the respective kneading drums 22 and 23. A motor 24 rigidly mounted on casing 1 rotates over a chain drive (not shown) a respective bevel gear of the associated kneading drum 22 or 23. A pivot bearing, which entrains the respective kneading drum, which is provided with a bayonet joint (not shown), is turned over a known pinion shaft, bevel gear and disk wheel.

The helical or spiral kneading trough body, hereinafter sometimes designated as feed path of the kneading rounder or kneader 15 or 16, is adjustably journaled at its lower end on bottom plate 25 which entrains for rotation kneading drum 22 (FIG. 3).

As a consequence of the rotation of bottom plate 25 and of the upright drum 22 the dough pieces will be directed and guided in a positive manner into the helical feed path formed by said spiral-shaped trough body via the kneading duct 26 from therebelow into said upward path.

This construction ensures that no dough pieces (fed from bore 14) will remain at the lower transition end of duct 26 which would otherwise cause possible operational stoppage or interruption without regard of the size of dough pieces to be kneaded and worked upon.

After the dough pieces have passed successively through and upwardly along the entire trough $26^1$ they are then fed as individualized dough pieces to further conveyor means 27 which may be associated and equipped with special guide plates or members 28 (FIG. 2). These plate members, like spreading plates 21 of conveyor means 13, may be coated at their effective guide surfaces with "Teflon" layer or like dough repellent material $21^1$ to prevent retention or sticking of the moving dough pieces on such guide surfaces.

The composite machine as disclosed in FIGS. 1 to 4 and further in greater details in additional FIGS. 1a, 1b, 1c, 2a, 2b and 3a, works as follows:

The hopper 2 on top of the dough dividing machine is filled with any limp size of prepared dough and this part of the machine aggregate is operated according to a known suction principle, as disclosed and explained in detail, e.g., in German DAS No. 1,234,637. The separated dough piece is then divided during subsequent ejection from measuring chamber 9 by means of the movement of ram or piston 11, e.g., through the action of a stationary knife arrangement into two equalsized dough parts, this knife arrangement (not shown) being located in shaftway or antechamber 12. In view of the knife arrangement, the measuring chamber 9 is provided with an exit opening, which corresponds to and is substantially equal to the cross section of the suction chamber.

A subdivision of the measuring chamber 9 or the juxtaposition of a series of measuring chambers may thus be avoided. According to the inventive thought on which the construction is based, the dough will not be subjected to an outer supplemental surface pressure during filling up of the measuring chamber 9 as the reduction of chamber cross section occurs gradually. This contributes to a gentle treatment of the dough. The ejected dough piece A1 is separated and detached by the action of the discharge or thrust plate 17a on lever 17 from the piston during the subsequent upward movement of the measuring chamber 9 (as disclosed in German DAS No. 1,234,637) and is then fed via discharge conveyor means 13 into the respective helical rounder unit 15 or 16, as the case may be.

The respective dough piece arrives at first at the top of the respective central bore 14 of the spiral-shaped trough body and is then passed therethrough onto the bottom of the kneading drum at transition canal 26. By rotation of the respective kneading drum by motor 24 via suitable gear or like drive connection 25[1], 25 and due to the axially extending grooves or flutes 26[1] (FIGS. 3, 3a) of the drum 22, each dough piece A3 is rolled upward and fed along the respective helical trough path of body 15 and is thus subjected to a complete and uniform kneading operation.

The flutes 26[1] provided in an extending lengthwise of the inner wall surface of kneading drum 22 have approximately a depth of about 1½ to 2 mm. and a width of about 2 to 3 mm.

The kneading drum is rotated in the direction, in which the pitch of the respective spiral trough of body or unit 15. Due to the rotation of the kneading drum each dough piece A3 is moved upward in succession under constant pressure between the trough wall and the inner kneading drum surface, whereby a continuous and constant dough rotation and rolling action is achieved, so that each dough piece leaves the rounder or kneader unit as a completely uniform kneaded, round dough piece.

According to the weight proper of the dough pieces, the selected pitch of the helical groove forming the spiral trough and the design and form of the trough-shaped groove ensure the attainment of a perfect round dough piece for all weight ranges.

By varying the formation of the kneading groove path and the kneading speed of the drum, the bakery machine according to the invention may be altered to correspond to almost all practical needs. A variation of the kneading path is further achieved by the variation of the rotary movement of the kneading, the direction of rotation being preferably opposed to that of the kneading drum, and the speed being reduced relative to that of the kneading drum. The kneading intensity may thus be determined and may be adjusted to the corresponding consistency of the dough piece or pieces. Conveyor delivery means 27 (FIGS. 1 and 2) may transport the round an completely kneaded dough pieces A4 to further processing stations (not shown).

Figure 6:
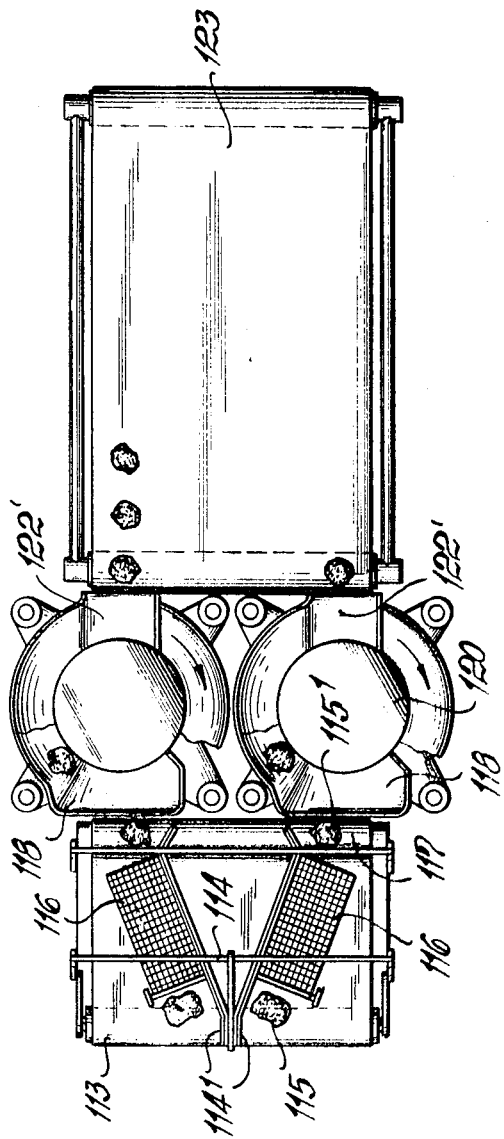
FIG. 6 is a schematic top plan view of the delivery conveyor with two rounders or kneaders and an additional delivery conveyor for removal of dough pieces as viewed in FIG. 5.

FIGS. 5 and 6 show another embodiment of a bakery machine according to the invention. The dough dividing machine remains practically unchanged. Instead of toothed segment 10 (see FIGS. 1b, 1c), a lever 110 is employed. The dough pieces dropping out of the shaftway 12 arrive likewise on a discharge conveyor 113. The latter has a trail or sheet 114 which is so arranged that the dough piece comes to lie between this sheet and the delivery belt surface when it rolls off. As indicated at 116, the sagging of the sheet causes the dough piece 115 to contact same and is subjected to treatment. At the lower end of the delivery conveyor 113 is arranged an auxiliary roller 117 which simplifies and facilitates feeding of the dough pieces to the rotary kneader or rounder 120. The delivery belt can be so turned and directed that the dough pieces fall either directly into the lower rounder trough or section 118 or into the next higher rounder section 119. The kneading path for the dough pieces can thus be varied according to the invention. The kneading device or rounder 120 is driven by motor 121 in any appropriate manner and gear connection, the dough pieces being rolled upward and kneaded in conjunction with the rotation of the fluted outer surface of drum of rounder 120 as above set forth. On the upper kneading rounder end 122 there is provided a discharge plate 122[1] leading onto additional delivery conveyor belt 123 from which the dough pieces are transported to another machine, such as an oven or the like.

This bakery machine is operated as follows: The dough dividing machine performs its action in the same manner as heretofore described with respect to FIGS. 1 to 4. The dough piece ejected by the piston 111 is detached in the course of the following upward stroke or movement of the measuring chamber by a strip plate and fed again to the delivery belt 113. Depending on the consistency of the dough, the same can be treated at this location (see FIG. 1a) or in the kneading unit or rounder which is accessible from the open top, by means of a distributor (see FIG. 1a) through oil, air or flour. After the dough piece has been subjected to preliminary treatment by contact with and the weight of the sheet 114, the piece arrives due to the action of the auxiliary roller 117 at the bottom of kneading station 118 or 119, depending on the tilted position of the delivery conveyor belt 113. By rotating the kneading drum of rounder 120 and through coaction with the axially extending grooves or flutes 120a in the kneading drum wall, the dough piece is rolled upward along the spiral groove path and is completely treated and kneaded, so that a continuous process stage is achieved. The flutes provided on the wall surface of the kneading drum have a depth of about 1½ to 2 mm. and a width of about 2 to 3 mm., as hereinabove mentioned.

The kneading drum is rotated in the direction in which the pitch or slope of the trough-shaped groove of the to rounder extends. Due to the rotation of the kneading drum, the dough piece is moved upward and rounded under constant pressure between the helical path and the kneading drum. Upon rotation and rolling actions of same the formed dough pieces leave the rounder as a uniformly kneaded, firm and round piece with a desired consistency or staying power.

Due to the weight of the dough pieces, the pitch of the helical path, and the design of its trough-shaped groove, a satisfactory round dough piece is obtained within practically all weight ranges. By varying the kneading path, as mentioned above, and by varying the kneading velocity, for example, by means of the motor drive 121 (FIG. 5), the machine according to the invention can be adapted to all practical needs.

The upright rounder assembly, which may include one or several rounders, may be transported from place to place, has its own power drive, and can be separated at any time from the dough dividing and measuring unit by simple coupling means, so that a different apparatus combination can be speedily achieved.

While with the known machines processing of doughs in the range of 30 to 70 g. or 50 g. to 100 g. can be carried out, the present invention permits also the processing of doughs within a weight range of about 28 g. to 280 g. and even up to 600 g. The "Teflon" layers or strata for guiding the dough pieces 115 along conveyor 113 are designated by numeral 114[1] (see FIG. 6).

FIGS. 7 and 8 show another embodiment of the invention. The dough-dividing machine corresponds again to that of FIGS. 1 and 5, so that a description of its details may be omitted.

However, the dough pieces from the antechambers in this embodiment of the invention are directed into the buckets 213 which are suspended on chain links 214 lines. The chain links are conducted over sprockets 215 and driven by the step gear drive mechanism 216. The buckets 213 are arranged to be freely swingable and have bottom apertures 213[1], so that drying of the dough pieces is ensured to a certain degree. Above the conveyor belt 217 there is provided a tilting or reversing device 218, by which the arriving buckets can be turned around so that the dough pieces are discharged onto the delivery conveyor 117. On this belt conveyor is arranged a wedge plate 219 with "Teflon" layer 219[1] (FIG. 8) which has the function of separating the dough pieces and feeding them to the respective rounders 220, 221. The belt conveyor 217 is adjustable in height in any known manner, so that the dough pieces can be fed to rounder units when located at different levels, in order to also vary the length of the kneading paths. The dough pieces are pre-shaped by pressure plates and trailing bands arranged above the belt conveyor. The kneading rounders 220, 221 are driven by motor 222 (FIG. 7), the dough pieces being kneaded by the rotation of the helically grooved worm of the kneader or rounder and being rolled and round shaped accordingly during upward movement. On the upper end of the respective kneading unit there is provided an auxiliary delivery conveyor belt 223, by which the dough pieces are transferred from the rounder units to another machine.

For certain processing operations it is necessary or economical, if the dough pieces are uniformly distributed on the conveyor belt. If several kneading rounders are provided, these will not feed the dough pieces at exactly the same time to the conveyor belt. In order to achieve nevertheless a uniform distribution on the conveyor belt, the belt is preferably driven by a step gear or like mechanism, which is actuated by known switching means, such as photocells, micro-switches or sensing devices known per se, when the last one of several kneading or helical spiral-grooved bodies has fed its dough piece to the corresponding conveyor belt 223. This results in that the conveyor belt continues to move only, when all kneading rounders have delivered a dough piece, so that they become uniformly distributed on the belt surface.

The operation of this latter embodiment is as follows: The dough pieces ejected from the dough dividing machine are respectively fed to buckets provided for this purpose. In these buckets fermentation takes place and continues, but is generally interrupted by the dividing and weighing operation. For these reasons the transport and movement of the buckets are so adjusted on the average experience depending on the dough consistency, that the dough pieces remain in the buckets for a period of about one minute. During this time period they will arrive at the turning or tilting station 218, which turns each bucket over, so that the respective dough pieces come to engage the conveyor belt surface in equal distance from each other. In special cases a fan 226 can be provided at one or more suitable locations and the dough pieces can also be sprinkled on their way with flour or similar substances (indicated in FIG. 1a), while the dough pieces may be surveyed by the operator. This is of particular advantage since different conditions can thus be met. A certain rough surface shaping may be effected on the lower conveyor belt 217 by a trail as previously disclosed in FIG. 5. The dough pieces are fed along wedge plate 219 to the respective kneading rounder, which is located between conveyor 217 and conveyor 223. In order to vary the kneading path, the conveyor belt 217 can be adjusted in height by a lifting device know per se, so that the dough pieces are fed to different kneading troughs sections of the rounders. After the dough pieces have been pretreated by means of a trail, they are distributed into the kneadtroughs of the rounders via bores, as set forth with respect to FIG. 3. By rotating the kneading drum and through cooperation with the axially extending flutes in the kneading drum wall the dough pieces are rolled along the spiral feed path and are kneaded completely in such a way that a continuous production is accomplished. The grooves or flutes provided along the inner wall surface of the kneading drum have a depth of about 1 to 2½ mm. and a width of about 2 to 3 mm.

The kneading drum is rotated into the direction, in which the pitch of the groove-shaped trough of the kneading worm extends. Due to the rotation of the kneading drum, the dough piece is moved toward the upper end of the feed worm under constant pressure between the kneading drum and the kneading troughs thereby to obtain a rolling action resulting in completely uniformly kneaded round dough pieces. Also this machine lends itself to variations of the kneading path, as described above, and to varying the kneading velocity, for example, by means of motor drive 222.

Reverting to the attached drawings showing certain details on an enlarged scale, FIG. 1a shows a flour duster or other material (such as oil, flour, air, etc.) distributor 17d assuming the shape of a funnel into which reaches a transmission of a lever system 17b, 17c, operatively connected to lever 17 (FIG. 1) which is linked to axle 18 and which operates at predetermined time intervals. Brush roller 17c is disposed near the bottom of distributor casing 17d, which may have perforations in its bottom with which brush 17c coacts to dust or distribute any material onto dough pieces therebelow to influence their density and consistency. Lever 17 carries further an abutment or pusher plate 17a, one effective end of which is covered by a layer of "Teflon," to avoid adhesion of dough pieces or their articles thereon during actuation of plate 17a within antechamber 12 hereinabove explained. Lever arms 5a and 6 are interconnected by a short lever 6a, whereas arm 5b operatively connects via an eccentric 5c with driven shaft 8 rotated from motor drive 7.

Figure 1C:
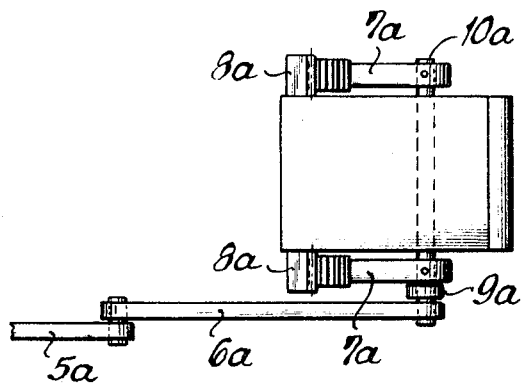
Figure 2:
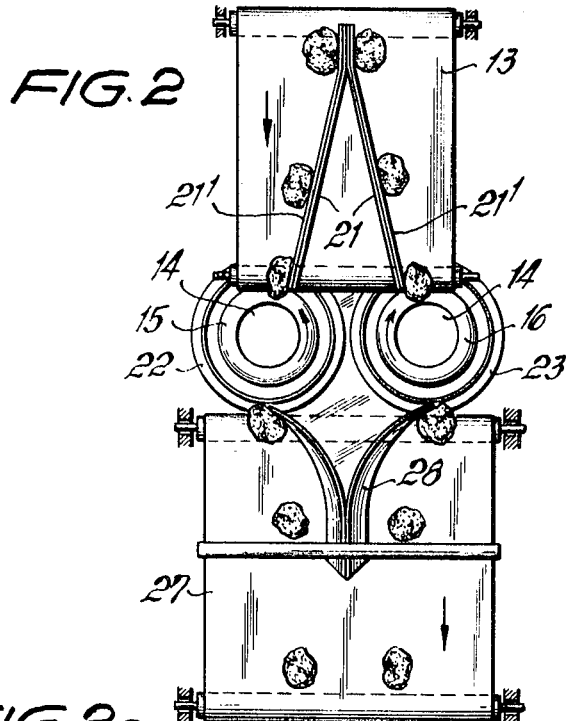
FIG. 2 is a diagrammatic representation of the supply and discharge of dough pieces to and from the rounder.

According to FIGS. 1b and 1c, which show side and top plan views, respectively, of the drive system for the piston 9 from motor 7, it may be realized that piston 9 is operatively connected to lever 5a via link 6a to a rod 9a, which carries two gear segments 7a on axle 10a, which segments coact and mesh with a gear rack 8a for moving and operating piston 9, as is well understood (see FIGS. 1b and 1c and FIG. 1).

Figure 2A:
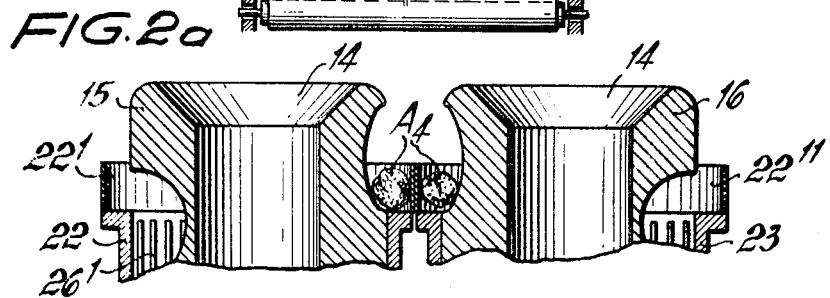
Figure 2B:
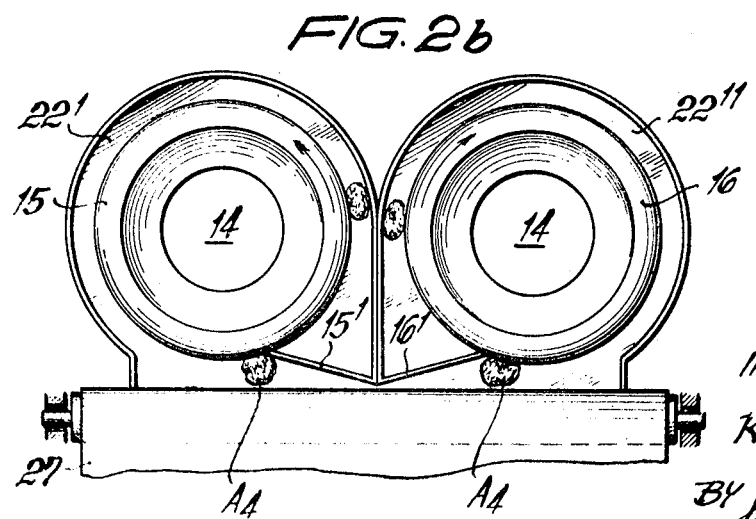

FIGS. 2a and 2b illustrate the upper portion of the spiral-shaped trough of rounders 15, 16 (on a larger scale) shown in medial longitudinal section and in top plan view, respectively. On the uppermost end of drums 22, 23 is mounted a rosette $22^1$, $22^{11}$, which coacts with conveyor belt 27 (see also FIG. 2) to discharge thereonto round and completely kneaded dough pieces A4. "Teflon" coated deflection plates $15^1$, $16^1$ aid in deviating these dough pieces in the desired direction toward conveyor 27.

FIG. 3a is a fragmentary detail view seen toward the inner wall surface of drum 22 provided with axially aligned flutes $26^1$. Drum 22 rests on and is rotatably connected with bottom plate 25 driven by gearing $25^1$ from motor 24 as indicated in FIG. 1.

FIGS. 7a and 7b indicate more schematically and in greater detail flour duster 224 seen in FIG. 7. This duster contains a brush made preferably of nylon bristles 225, to be rotated from an auxiliary driving arrangement 215 via the motor of the dough divider device, which may also actuate fan or ventilation unit 226. Buckets 213 may be perforated for airing their contents and/or may be lined with felt cloth at $213^1$ to bring about change of dough consistency to a certain desired degree. Abutment plate on arm 117 is fitted with a layer 117a of "Teflon" for a purpose hereinbefore explained (FIG. 7a indicating in partial side elevation arm 117 with this "Teflon" layered abutment plate).

It can thus be seen that there has been provided in accordance with this invention a novel system for preparing from a lump of dough or similar formable material individualized dough pieces in a composite dough dividing and kneading machine or rounder, which is characterized in that precut or divided dough pieces are ejected from the dough divider and are successively conveyed to said kneading rounder which comprises at least two upright kneading drums located adjacent each other with each drum embracing a helical feed trough forming part of a rounder unit which is provided along its outer surface with a helix or spiral-shpaed path and along its longitudinal center axis with a central bore, which terminates near the bottom of the respective rounder unit and forms groove means which establish communication between the corresponding central bore and the spiral-shaped trough, so that such precut dough pieces conveyed into said bore from thereabove are subjected to kneading action upon rotation imparted to each drum, while said dough pieces are successively transferred from said bore into said spiral-shaped groove and in contact with and upwardly along the inner wall of the drum, which is shaped to substantially uniformly knead the dough pieces while the latter are being fed in upward direction along the groove sections defined by the respective surface of said inner wall of each drum, and transporting means located adjacent said kneading machine and near the upper end of said trough for receiving and discharging therefrom in timed relation completely kneaded round dough pieces, successively, for delivery to further treatment.

It is to be understood from the aforementioned disclosure, that there has been created according to the invention a highly efficient operating system applicable in particular to bakery machines of the composite type consisting of dough dividing apparatus coupled with a dough kneading or rounder station, which system lends itself to a great variety of applications in the bakery and kindred fields and may be modified or altered within the concept of this invention for adaptation to various purposes.

What is claimed is:

1. A system for successively preparing individualized dough pieces from a lump of dough or similar formable material in a composite dough dividing device and kneading rounder; comprising conveying means for moving divided dough pieces from said dough dividing device to said kneading rounder means, each rounder means comprising at least two rounders provided with two upright kneading drums located adjacent each other with each drum associated with a corresponding spiral-shaped trough body forming an upward feed path for treating said dough pieces, a central bore provided along the longitudinal center axis of each drum and extending through the respective trough body, said bore terminating in a duct radially directed near the bottom of each body, thereby to establish communication between said central bore and the spiral-shaped trough body, so that dough pieces fed into said bore from the upper end thereof are fed for kneading action between the confronting surface of each drum and the corresponding trough body forming an upward feed path upon rotation imparted to each drum, said dough pieces being successively transferable from within said bore to said spiral-shaped trough body and then into contact with the facing wall of each rotating drum, which is shaped to aid in substantially uniformly kneading the dough pieces fed in upward direction along flutes provided along said facing wall of each drum, which flutes are coated with a layer of adhesion repellent material, and means transporting from the upper end of each trough body substantially completely kneaded and round dough pieces in succession and in timed relation to a further dough treatment station.

2. A system for continuously preparing dough pieces from a lump of dough or similar formable material in a composite dough dividing machine and kneading rounder; comprising conveying means for moving precut dough pieces ejected from said dough dividing machine to at least one of said kneading rounders, each rounder including an upright, elongated kneading drum and a spiral-shaped grooved body extending along and adjacent said drum and terminating in a lower body groove near the bottom of the drum, said conveying means delivering said precut dough pieces to said body groove at predetermined location thereof to effectuate kneading of said dough pieces upon rotation of said drum relative to said spiral-shaped grooved body, said dough pieces being moved in contact with said drum in upward direction thereof along said spiral-shaped grooved body toward the upper end of the latter, the wall of said drum being provided with flutes to substantially uniformly knead the dough pieces within the space between and along the fluted wall surface of said upright drum and said grooved body, means infinitely varying the speed of rotation between said spiral-shaped body and said drum, and conveyor means communicating with said spiral-shaped body facilitating transportation of dough pieces in timed relation for discharge from the upper end of the respective rounder.

3. A system according to claim 2, characterized in that said drum surrounds said spiral-shaped grooved body, a central longitudinal bore passing through said body, duct means establishing communication between the grooved body and the interior of said drum, said duct means constituting a discharge opening reaching from said bore toward the lower end of said drum, and a drum bottom plate forming said lower drum end constructed for rotating said drum relative to said grooved body.

4. A system according to claim 2 characterized in that said drum is surrounded by said grooved body in spiral-shaped fashion, and transporting means for said dough pieces from said dough dividing machine for moving said dough pieces into said grooved body, said transporting means being swingably and pivotally journaled relative to said grooved body.

5. A system according to claim 4, characterized in that said transporting means including bucket elements registerable with and for location below said precut dough pieces upon their arrival from said dough dividing machine, and a chain drive including a step gear mechanism moving said bucket elements past a station for discharging said dough pieces, successively, from said bucket elements onto a conveyor below said station, said conveyor being swingably movable and operatively connectable to said grooved body for delivery of said dough pieces thereinto.

6. A system according to claim 2, characterized in that said grooved body and said drum of each rounder are rotatable relative to each other, and means to rotatably move said grooved body and said drum in opposed directions.

7. A system according to claim 2, characterized in that the pitch of said grooved body extends in the direction of rotation of said drum.

8. A system according to claim 2, characterized in that said kneading rounder is provided with an axle, which is tiltably journaled and operatively connectable to a motor drive.

9. A system according to claim 2, characterized in that said conveyor means is associated with spreading means for said dough pieces to direct the latter to two adjacent kneading rounders, respectively, and means operable at the top ends of the drums of said kneading rounders for directing discharged kneaded and round dough pieces via guiding means to further conveyor means.

10. A system according to claim 9, characterized by a sheet-forming trail associated with said conveyor means, said trail normally sagging with a portion of the latter onto the upper surface of said conveyor means above which said trail is mounted, said trail being engageable with said dough pieces on said conveyor means for pretreatment prior to their arrival at said kneading rounder.

11. A system according to claim 5, characterized in that said chain-driven bucket elements being each provided with a semicircular bottom perforated to permit aeration and further shaping of dough pieces during their transportation therein, said bucket elements being suspended for swinging movement relative to said chain-drive.

12. A system according to claim 11, characterized in that at least some of said bucket elements are lined with a porous textile material facilitating compensation for predetermined dough consistency.

13. A system according to claim 2, characterized in that said dough dividing machine and said dough kneading rounders are operatively interconnected by dough treatment means and transporting means, and drive means operating said dividing machine, said rounders, said treatment means and said transporting means in timed relation to each other, thereby to ensure dough pieces of uniform quality and staying power under consideration of various consistencies, fermentation and weight ranges.

* * * * *